United States Patent
Pinding et al.

(10) Patent No.: US 8,416,711 B1
(45) Date of Patent: Apr. 9, 2013

(54) SYSTEMS AND METHODS FOR SHARING AVAILABILITY STATUS INFORMATION BETWEEN NETWORK NODES

(75) Inventors: Armo Pinding, Tallinn (EE); Madis Kaal, Tallinn (EE)

(73) Assignee: Skype, Dublin (IE)

( * ) Notice: Subject to any disclaimer, the term of this patent is extended or adjusted under 35 U.S.C. 154(b) by 314 days.

(21) Appl. No.: 12/584,132

(22) Filed: Aug. 31, 2009

(51) Int. Cl.
*H04L 12/28* (2006.01)

(52) U.S. Cl. ........ 370/254; 370/401; 709/227; 709/243; 709/249

(58) Field of Classification Search .................. None
See application file for complete search history.

(56) References Cited

U.S. PATENT DOCUMENTS

| | | | |
|---|---|---|---|
| 7,457,293 B2 * | 11/2008 | Kokado | 370/392 |
| 7,464,168 B1 * | 12/2008 | Abdelaziz et al. | 709/229 |
| 7,876,698 B2 * | 1/2011 | Sienel et al. | 370/252 |
| 2004/0064568 A1 * | 4/2004 | Arora et al. | 709/228 |
| 2008/0288654 A1 * | 11/2008 | Matuszewski et al. | 709/238 |
| 2008/0291896 A1 * | 11/2008 | Tuubel et al. | 370/352 |
| 2009/0287829 A1 * | 11/2009 | Matuszewski | 709/228 |

FOREIGN PATENT DOCUMENTS

WO  WO 2005/009019 A2  1/2005

* cited by examiner

*Primary Examiner* — Brian Roberts
(74) *Attorney, Agent, or Firm* — Wolfe-SBMC (57) ABSTRACT

A communication system, method and client program for communicating via a first network. The system comprises a first network and a router coupling the second network to the first network, the router comprising an address translator configured to map second-network addresses to a lesser number of first-network addresses identifying the second user nodes collectively to the first network. Each of the second user nodes is installed with a communication client configured so as when executed on the second user nodes to: compare the first-network addresses of two of the user nodes, and, if their first-network addresses match such that both are nodes of the second network, communicate an availability status of one of the two user nodes between the two user nodes directly over the second network without routing via the first network.

16 Claims, 4 Drawing Sheets

SYSTEMS AND METHODS FOR SHARING AVAILABILITY STATUS INFORMATION BETWEEN NETWORK NODES

FIELD OF THE INVENTION

The present invention relates to a communication system implemented over a first and second network, and to communicating an availability status between nodes of the second network. For example, the first network may be the Internet and the second network may be a private network coupled to the Internet by means of a network address translation (NAT) scheme.

BACKGROUND

Figure 1:
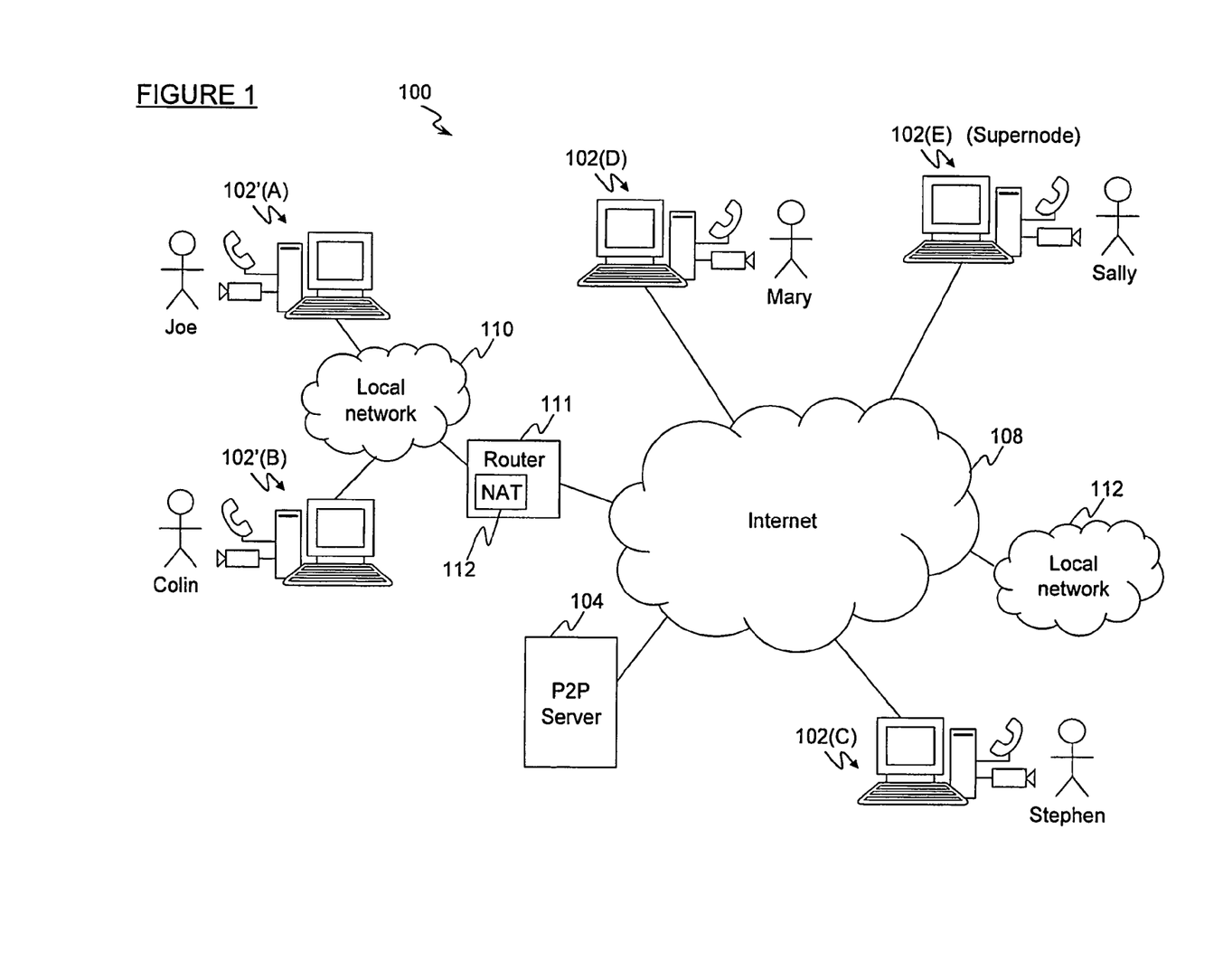
FIG. 1 is a schematic representation of a first and second network.

FIG. 1 is a schematic illustration of a communication system 100 implemented over a packet-based network such as the Internet 108 comprising a plurality of interconnected elements. Each network element is connected to the rest of the Internet 108, and is configured to communicate data with other such elements over the Internet by transmitting and receiving data in the form of Internet Protocol (IP) packets. Each element also has an associated IP address locating it within the Internet, and each packet includes a source and destination IP address in its header. The elements shown explicitly in FIG. 1 are: a plurality of end-user terminals 102(C) to 102(E) such as desktop or laptop PCs or Internet-enabled mobile phones; a server 104 of an Internet-based communication system; and a router 111 coupling to another network 110. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

Packet-based networks such as the Internet can be used to implement a number of different types of communication between end-users, such as voice-over-IP (VoIP) calls, video-over-IP calls, instant messaging (IM) chat sessions, and file transfer. To achieve this, each of a plurality of end-users installs and executes a client application on their respective terminal 102. The client applications together with any required functionality of server 104 form a communication system running over the Internet. Further, by communicating via a gateway to a telephone network (not shown), the system may also allow communication with other types of network such as a PSTN network in order to call a conventional fixed land-line or a mobile cellular network in order to call a mobile phone.

For example, voice-over-IP (VoIP) calls are beneficial to end-users because they are typically of significantly lower cost than fixed line or cellular mobile calls, often even free when from one VoIP client to another (rather than via a gateway to a telephone network). The cost savings may be particularly significant in the case of international or long-distance calls, because when communicating over the Internet using IP then the cost need not be dependent on distance. Similar comments may apply to video-over-IP calls.

In order to communicate with another client, the initiating client needs to know the IP address of the terminal 102 on which the other client is installed. Therefore a process of address look-up is required.

Some Internet-based communication systems are managed by an operator, in that they rely on one or more centralized, operator-run servers for address look-up (not shown). In that case, when one client is to communicate with another, then the initiating client must contact a centralized server run by the system operator to obtain the callee's IP address.

In contrast to these operator managed systems, another type of Internet-based communication system is known as a "peer-to-peer" (P2P) system. The idea behind peer-to-peer (P2P) systems is to devolve responsibility away from centralized operator servers and into the end-users' own terminals. In the least, this means responsibility for address look-up is devolved to end-user terminals like those labelled 102(C) to 102(E) in FIG. 1. Each user terminal 102 runs a P2P client application, and each such terminal forms a node of the P2P system. P2P address look-up works by distributing a database of IP addresses amongst a subgroup of the end-user nodes, termed herein "supernodes". The database is a list which maps the usernames of all online or recently online users to the relevant IP addresses, such that the IP address can be determined given the username.

Each supernode acts as an IP address look-up point for a group of other nearby nodes, and its respective list contains the usernames and IP addresses of the nodes in that subgroup. The subgroup need not necessarily be "nearby" in terms of geographical location, but rather in terms of how directly connected the nodes are to the supernode (which may be related to geographical location). Each client will monitor certain factors of its respective terminal 102 such as constancy of IP address and up-time to determine whether it should become a supernode. If so, the IP address of the supernode is advertised to the client applications running on other nearby nodes, and the supernode gathers the IP addresses and usernames of those nearby nodes for its list. Then, instead of contacting a centralized server, the client on an initiating node will contact its supernode to look up the IP address of the other node. Referring to FIG. 1 for example, the client on one user node 102(C) may look up the IP address of another user node 102(D) from a further user node 102(E) which happens to have become a supernode (the user of the supernode need not be involved in the communication or be a contact of the two other users). If the contacted supernode does not have the required IP address in its list because its respective subgroup does not include said other node, then the querying node 102(C) may contact one or more other supernodes whose subgroups may include that other node 102(D) and thus determine the required address. In this way, the list mapping usernames to IP addresses is distributed amongst end-user nodes and no server is required for address look-up.

In addition to address look-up, a supplier of the P2P client application may choose to provide some additional, secondary features which in contrast to address look-up may involve a server 104. One such function is the distribution of authentication certificates which are supplied from the server 104 to the user terminals 102 when they first register with the P2P system. After initial registration, the users' clients can then exchange the certificates in order to authenticate each other without further involvement of a server. Further details on the use of digital certificates for authentication in an exemplary P2P system can be found in WO 2005/009019. The P2P server 104 may also be used to provide some other secondary features in relation to a P2P network, such as to host contact lists and/or "avatar" images (images chosen by the users to represent themselves graphically to others of the P2P network). Nonetheless, the primary function of address look-up is still handled in a distributed fashion by end-user nodes, not by a server.

Once known, the address allows a user to establish a voice or video call, or send an IM chat message or file transfer, etc. Additionally however, the address may also be used when the client itself needs to autonomously communicate information with another client. One example of this occurs when clients need to share presence information. Presence is an availability status of the user in question, preferably defined in part by that user themselves. For example, presence status may indicate that the user is offline, that the user is online and available, or that the user is online but has selected to be shown as unavailable ("do not disturb").

The mechanism for handling presence depends on the relative network locations of the nodes involved. As mentioned, there may exist a separate, localized network 110 coupled to the Internet via a router 111. The local network 110 comprises a plurality of local end-user nodes 102' such as desktop or laptop PCs. Two such nodes 102'(A) and 102'(B) are shown in FIG. 1 for illustrative purposes. The local network 110 is said to be "separate" from the Internet in the sense that it uses a different internal address space. Each local node 102' is allocated a local address which identifies it internally within the local network 110 and thus allows communication within the local network. In order to communicate externally over the Internet 108, the router 111 therefore comprises an address translator 112 which is arranged to translate between the local address space of the local network 110 and the external IP address space of the Internet 108. Such a scheme or process may be referred to as Network Address Translation (NAT).

Usually, the local network 110 is identified externally over the Internet 108 by fewer external IP addresses than there are user nodes of that local network 110, such that an external IP address does not uniquely identify a node of the local network 110. That is, the local nodes 102' are represented over the Internet 108 by fewer addresses than the number of those local nodes. Often the whole or a part of the local network 110 is identified over the Internet 108 by only a single external IP address. Thus an entire address space comprising a plurality of addresses is mapped to a single external IP address. In this sense, the address translator 112 could also be described as an address multiplexer (for outgoing packets) and de-multiplexer (for incoming packets). Techniques for such mapping are known in the art.

As mentioned, an IP packet contains a source and destination address in its header. Thus for an outgoing packet transmitted from a local node 102' to an external node 102, the router 111 translates its source address from the local address space to the external IP address space. Reciprocally, for an incoming packet transmitted from an external node 102 to a local node 102', the router 111 translates its destination address from the external address space to the local address space.

However, NAT breaks the IP model of end-to-end connectivity across the Internet and obscures the local network's internal structure, because all packets appear to external nodes as if they originated from the router 111. This has an impact on how presence updates are handled.

Generally, the presence process starts with searching for contacts' network addresses in the P2P network. As discussed, the addresses are kept in the distributed database which is divided between different supernodes. When the presence module in the client requests a search, the query is sent to the distributed database. Once the search reply comes back, the presence module sends a status request command to the specified address. If the contact is online, it responds with a reply indicating its status. If no reply is received, the contact is deemed to be offline.

As for the route that is selected to send the status request commands through the network, this depends on whether sending UDP (User Datagram Protocol) traffic directly to the target node is possible. If it is, the commands are sent directly to the node. However if the node is behind an NAT then the requests are routed to the target node through the supernode to which the target node belongs. Replies travel back using the same route.

So for example, if the client running on an external node 102(C) needs to know the presence status of one of the nodes 102(A) of the local network 110, then the status request is routed to it through the supernode 102(E). The response indicating the requested presence information also returns back via the supernode 102(E).

SUMMARY

The inventor has identified that a particular problem exists in that, previously, nodes located behind the same NAT were not aware of each other and had to route packets through supernodes outside their network. Thus previously, the communication client would simply assume that the presence of any contact behind an NAT would have to be polled via a supernode.

However, the inventor has recognised that a significant processing burden can be incurred by presence updates due to the requirement to constantly translate between the two address spaces. Particularly, presence updates are typically required relatively frequently compared to other events, often being performed periodically.

More generally, a similar problem can occur in any situation where a second network is represented to a first network by fewer addresses than there are nodes of the second network.

The solution according to the present invention is to make use of the externally visible address to determine whether the presence updated needs to be routed externally to the second network, or whether both nodes are in fact within the same second network.

Thus according to one aspect of the present invention, there is provided a communication system for communicating via a first network, the first network comprising a plurality of first user nodes each having a respective first-network address identifying it within the first network, and the communication system comprising: a second network comprising a plurality of second user nodes, each having a respective second-network address identifying it internally within the second network; and a router coupling the second network to the first network, the router comprising an address translator configured to map said second-network addresses to a lesser number of first-network addresses identifying the second user nodes collectively to the first network; wherein each of the second user nodes is installed with a communication client for communicating with another of said second user nodes via the second network using the second-network addresses, and for communicating with the first user nodes via the router and first network using the first-network addresses, the communication clients being configured so as when executed on the second user nodes to: compare the first-network addresses of two of the user nodes, and, if their first-network addresses match such that both are nodes of said second network, communicate an availability status of one of the two user nodes between the two user nodes directly over the second network without routing via the first network.

The present invention therefore provides improved communication of presence updates between nodes behind the same address translation scheme or translated address space.

Preferably the communication clients may be configured to: if the compared first-network addresses do not match such that one of the two user nodes is a node of the first network, communicate an availability status of one of the two user nodes between the two user nodes via the first network.

In embodiments, each of the communication clients may be configured so as when executed on its respective second user node to: compare the first-network address of the respective second user node with that of another of said user nodes, and, if their first-network addresses match such that both are nodes of said second network, poll the availability status of the other user node directly over the second network without routing via the first network.

The above problem can be particularly problematic in peer-to-peer systems, because the frequent relaying of presence information can place an undesirable bandwidth burden on mediating end-user nodes such as supernodes. Also, the end-user node acting as the supernode may change, which results a greater probability of packet loss if presence needs to be routed via supernodes. It would be desirable to reduce or avoid these problems in peer-to-peer systems.

Therefore in a preferred application of the present invention, the communication client may be configured to retrieve the first-network address of the other user node from a one of said first user nodes storing part of a distributed database of first-network addresses.

In further embodiments, the communication client may be configured to: if the compared first-network addresses match such that the two user nodes are both nodes of said second network, probe whether direct communication between the two user nodes over the second network is possible, and if so communicate the availability status directly over the second network without routing via the first network.

The communication client may be configured to: if direct communication between the two user nodes over the second network is not possible, communicate the availability status by routing through the first user node which stores said part of the distributed database.

Said lesser number may be one.

The communication client may be configured such that said polling is periodic.

Each of the communication clients may be configured so as when executed on its respective second user node to: compare the first-network address of the respective second user node with those of a plurality of others of said user nodes; and for each of the plurality of other user nodes: if the compared first-network addresses match such that the other user node is a node of said second network, poll the availability status of that other user node directly over the second network without routing via the first network, but otherwise if the compared first-network addresses do not match such that the other user node is a node of the first network, communicate an availability status of one of the two user nodes between the two user nodes via the first network.

Said first network may be a public network and said second network may be a private network requiring authorisation to access.

Said first network may comprise the Internet and said first addresses are IP addresses.

According to another aspect of the present invention, there is provided a method of communication using a first network comprising a plurality of first user nodes each having a respective first-network address identifying it within the first network, a second network comprising a plurality of second user nodes each having a respective second-network address identifying it internally within the second network, and a router mapping said second-network addresses to a lesser number of first-network addresses identifying the second user nodes collectively to the first network; wherein the method comprises: providing each of the second user nodes with a communication client for communicating with another of said second user nodes via the second network using the second-network addresses, and for communicating with the first user nodes via the router and first network using the first-network addresses; and by providing the communication clients for execution on the second user nodes: comparing the first-network addresses of two of the user nodes, and, if their first-network addresses match such that both are nodes of said second network, communicating an availability status of one of the two user nodes between the two user nodes directly over the second network without routing via the first network.

In embodiments, the method may further comprise steps in accordance with any of the system features disclosed above.

According to another aspect of the present invention, there may be provided a communication client for communication using a first network comprising a plurality of first user nodes each having a respective first-network address identifying it within the first network, a second network comprising a plurality of second user nodes each having a respective second-network address identifying it internally within the second network, and a router mapping said second-network addresses to a lesser number of first-network addresses identifying the second user nodes collectively to the first network; wherein the communication client comprises code embodied on a computer-readable medium and configured so as when executed on a respective on of the second user node to: communicate with another of said second user nodes via the second network using the second-network addresses; communicate with the first user nodes via the router and first network using the first-network addresses; and compare the first-network address of the respective second user node with that of another of said user nodes, and, if their first-network addresses match such that both are nodes of said second network, poll the availability status of the other user node directly over the second network without routing via the first network.

In embodiments, the communication client may be further configured in accordance with any of the system features disclosed above.

BRIEF DESCRIPTION OF THE DRAWINGS

For a better understanding of the present invention and to show how it may be carried into effect, reference will now be made by way of example to the accompanying drawings in which.

DETAILED DESCRIPTION

As mentioned, previously nodes located behind the same NAT were not aware of each other and had to send packets via supernodes outside their network.

Typically, a presence process starts by searching for contacts' network addresses, which are kept in a distributed database divided between different supernodes. When the presence module in the client requested a search, the query is sent to the distributed database. Once the search reply comes back, the presence module in the client sends a status request command to the specified address. If the contact is online, it responds with a reply indicating its status. If no reply is received, the contact would be deemed to be offline.

As far as the route is concerned, that depends on whether sending UDP traffic directly to the target node was possible. If it is, the commands are sent directly to the node. However if the node is behind an NAT the requests are routed to the target node through the supernode to which the target node belongs. Replies travel back using the same route. Previously, the client would have simply assumed that any target node behind an NAT must be polled by routing the presence polling request through a supernode.

According to preferred embodiments of the present invention on the other hand, the external address of the local network 110 is used to determine whether two nodes are in fact behind the same NAT and therefore can be polled directly. A special collection of address information is allocated to each node, which may be referred herein to as the "nodeinfo". The nodeinfo preferably contains three IP addresses: a local address (as seen by the node itself within the local network, often private IP), a remote or external address (as seen from outside, i.e. the NAT translated address), and a supernode address. When a new nodeinfo is found, its remote IP is compared with the node's own remote IP. If they match, the two nodes are probably located behind the same NAT. The fact of whether direct communication is possible may be determined by probing. The results of probing are stored and if direct transmission to the local IP does not work, then the client falls back on routing presence requests through a supernode.

The preferred scheme may thus achieve any or all of the following advantages.

Firstly, the scheme requires fewer NAT mappings. E.g. in the case of peer-to-peer applications, all presence updates are sent either directly to target nodes or, if that is not possible, routed through the supernodes that represent them (as opposed to client-server applications where clients communicate with each other only via limited number of servers). If the peer node from which the presence updates originate lies behind a NAT, it may generate a lot of NAT mappings in the router which performs NAT translations. If too many client instances are running in parallel, the NAT-router may run out of memory which leads to lost packets due to router's inability to map inbound packets back to corresponding nodes in the private network. Therefore, it is much better if the nodes could talk to each other directly and reduce or eliminate the need for NAT mappings.

Secondly, the preferred scheme uses less supernode bandwidth: communicating directly means less traffic routed through supernodes.

Thirdly, the preferred scheme provides higher reliability: client nodes are less susceptible to problems caused by supernode changes (since the address in local network remains the same). Lower probability of packet loss due to shorter path (one hop instead of being routed through many routers in the public Internet, through a supernode and from there to the target node).

A preferred scheme will be discussed in more detail later, but first some details of an example terminal and client application are discussed.

Figure 2:
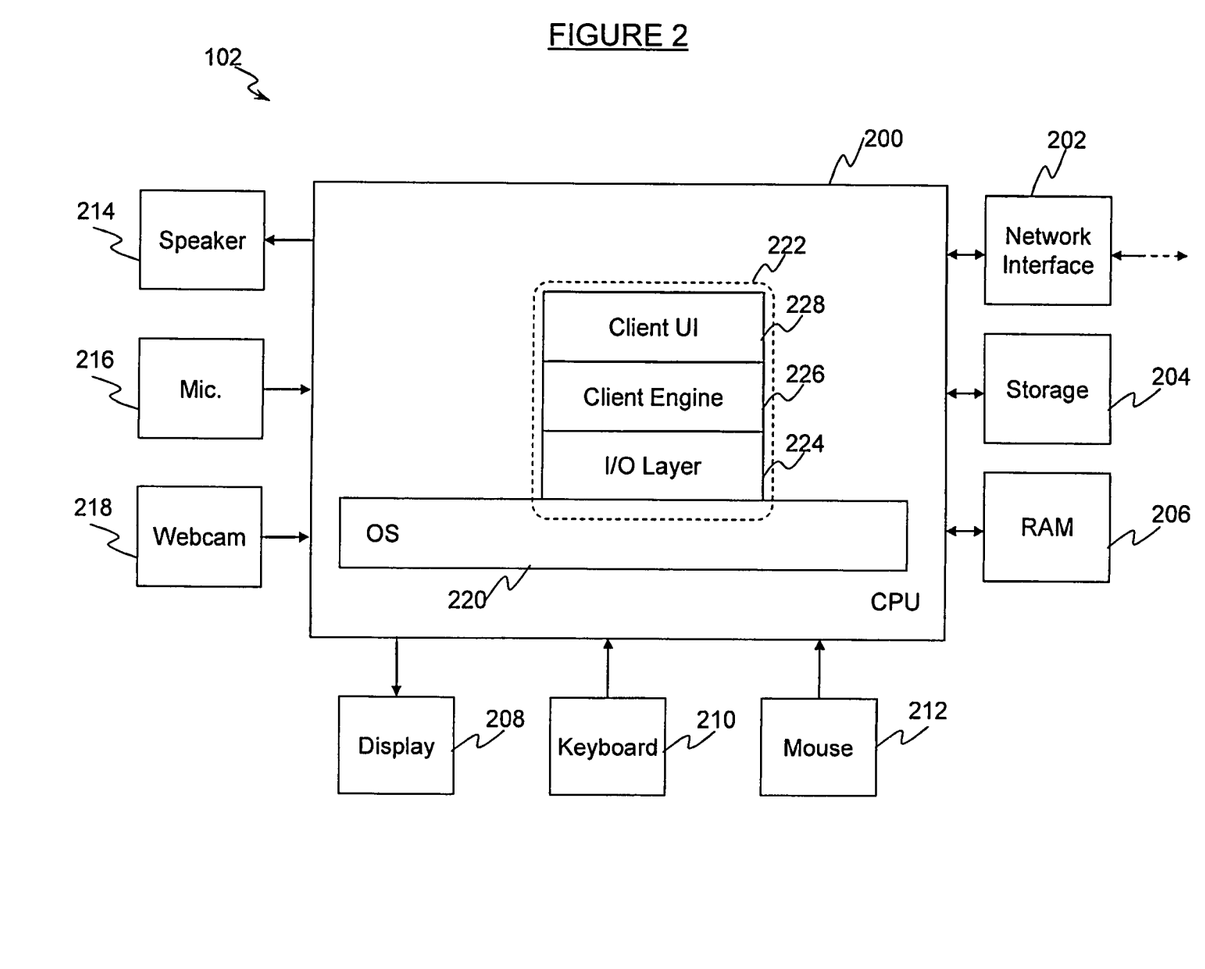
FIG. 2 is a schematic block diagram of a user terminal installed with a web-client application and P2P client application.

The schematic block diagram of FIG. 2 shows an example of an end-user terminal 102, which is configured to act as a terminal of a P2P system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 208, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. The storage device may also store other Internet-related software such as a web-browser (not shown). On start-up or reset of the terminal 102, the operating system software 220 is automatically loaded into the RAM 206 and from there is run by being executed on the CPU 200. Once running, the operating system 220 can then run applications such as the web browser application and P2P client application 222 by loading them into the into the RAM 206 and executing them on the CPU 200. To represent this schematically in FIG. 2, the operating system 220 and P2P client application 222 are shown within the CPU 200.

The P2P client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2. The web browser application and P2P client application 222 are said to be run "on" the operating system 220. This means that in a multitasking environment they are scheduled for execution by the operating system 220; and further that inputs to the web browser application and the lowest (I/O) layer 224 of the P2P client application 222 from the input devices 202, 216 and 218 as well as outputs from web browser application and the I/O layer 224 of the P2P client application 222 to the output devices 202, 208 and 214 may be mediated via suitable drivers and/or APIs of the operating system 220.

The I/O layer 224 of the P2P client application comprises audio and/or video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine may retrieve presence information from the other clients of the users in the contact list by periodically polling them via a public API, and reciprocally provide its own presence information when polled by those other clients that are online. Exchange of presence information directly between clients via a public API is the preferred option, but alternatively the presence information could be exchanged via an intermediate node such as a server 104.

The UI layer 228 is responsible for presenting decoded video to the user via the display 208, for presenting the output on the display 208 along with other information such as presence and profile information and user controls such as buttons and menus, and for receiving inputs from the user via the presented controls.

Figure 3:
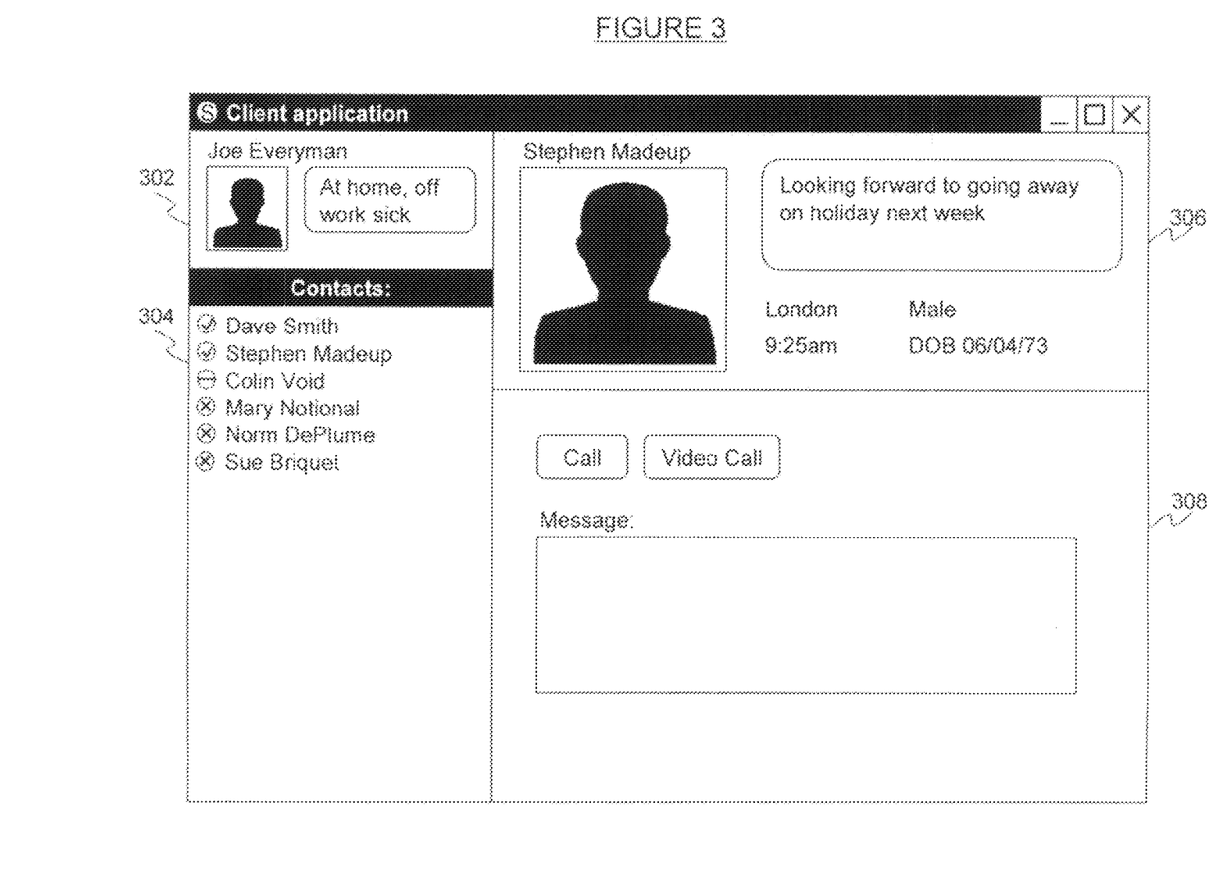
FIG. 3 is a schematic representation of a P2P client application user interface viewed on a user terminal.

FIG. 3 illustrates schematically an example user interface as would be presented to a user on the display 208 when the P2P client application 222 is open for viewing by the user. In this example, the user interface 228 is that of the P2P client application 222 running on a first user terminal 102(A). The user interface is divided into a number of panels. A first panel 302 displays some details of the user's own profile, in this example the user's name "Joe Everyman", an avatar image, and a "mood message". These details may be stored at and retrieved from the P2P server 104 by the client engine 226, so as to be made available to other users of the P2P network. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability (the mood message may therefore in some cases be considered a type of presence information). When other users view Joe's profile in their own clients, these details will be visible to them via the P2P server 104, and vice versa the other users' details will be made available to Joe's client (if they are in each others' contact lists).

A second panel 304 of the user interface displays a contact list of the user's friends or associates, these being other users of the P2P network. Entry in the contact list is preferably conditional on agreement from the users. The contact list may be stored at and retrieved from the P2P server by the client engine 226, so that the same list is available to the user uses different instances P2P client application on different terminals. Presence information is also displayed in the panel next to each contact. The presence information represents an availability status which preferably comprises an indication of whether the user is online, and preferably is in part user-defined. For example, the presence status may be: the user is offline (x), the user is online and has selected to be shown as available (√), or the user is online but has selected to be shown as not available (–).

A third panel 306 of the user interface displays the profile of a selected user from the contact list, in this case "Stephen Madeup", a user of another user terminal 102(B). The displayed profile includes Stephen's name, avatar image and mood message, along with other details Stephen may have supplied to the P2P server 104 such as current location, local time, gender and date of birth (DOB). These profile details are retrieved from the P2P server 104 by the client engine 226.

A fourth panel 308 of the user interface then displays communication controls in relation to the selected contact, such as buttons allowing a voice or video call to be established, and a window for entering chat messages. Any incoming chat messages and chat history will be displayed in this panel also, and file transfers may be established by dragging-and-dropping files into the chat window.

Figure 4:
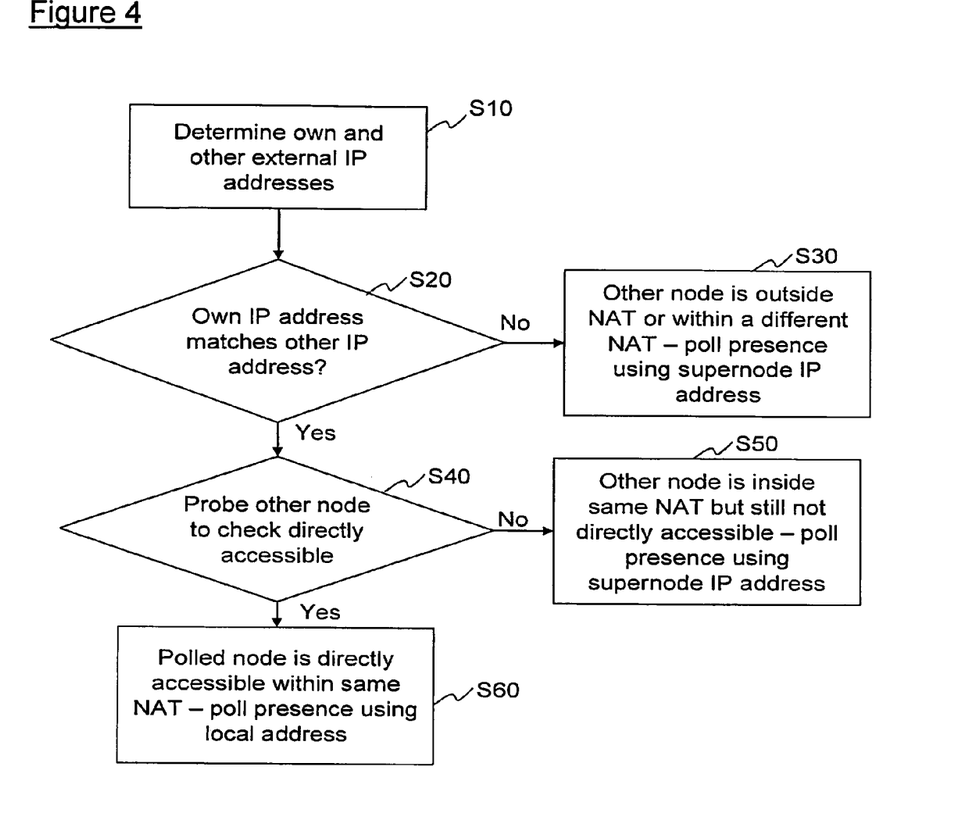
FIG. 4 is a flow chart showing a process for polling an availability status.

An example of a presence polling process is now discussed in relation to the flow chart of FIG. 4. As mentioned, the client 222 is preferably configured to periodically poll all the other nodes in its contact list. For convenience the following will be described in terms of polling the presence of one other node, but it will be appreciated that the process may be duplicated over as many other nodes as required.

The same process is implemented in each client application 222 of each node of the P2P system or other communication system in question, whether in the local network 110, wider Internet 108 or indeed in another local network 112 coupled to the Internet. However, it will be appreciated that the outcome will depend on the network location of the polling node relative to the polled node.

The process starts at step S10, at which the client 222 determines its own external IP address and the external address of the node whose presence is to be polled. It does this by retrieving the "nodeinfo" for the other node via one or more supernodes, e.g. 102(E). According to P2P principles, this nodeinfo is preferably stored in a distributed fashion as discussed above, and preferably includes at least the internal local address (if appropriate), external IP address, and the IP address of the supernode of each contact (remember the nodes do not necessarily share the same supernode).

At step S20, the client 222 compares its own external IP address to the external IP address of the node to be polled (the target node). If they do not match, this means the two nodes are not part of the same local network, e.g. 110. This could be because the polling node is part of the local network 110 whilst the polled node is external to the local network, or vice versa the polled node is part of the local network 110 whilst the polling node is external to the local network. For example, referring to FIG. 1, if the client running on node 102(A) polled the presence of node 102(C) then the match would fail, or if the client running on node 102(D) polled the presence of node 102(B) then the match would also fail. Another reason could be because both the polled and polling nodes are both not part of any local network, e.g. nodes 102(C) and 102(D) in FIG. 1; or because the polled and polling nodes are part of different local networks 110 and 112. Whatever the reason, if no match is found then the process moves to step S30 at which the client 222 polls the presence by more conventional means via an external route, e.g. by routing the presence polling request to the polled target node through one or more supernodes in the case of P2P.

However, if the client 222 determines at step S20 that the external IP addresses do match, this means the polled node and polling node are both within the same local network, e.g. 110, behind the same NAT scheme. Advantageously according to preferred embodiments of the present invention, this means the presence does not need necessarily to be polled via an external route but instead may be able to be polled directly across the local network 110 without routing the polling request or its response via the external Internet 108 (previous presence polling techniques on the other hand would not have performed this comparison and would have simply assumed that any node behind an NAT would be not directly accessible, without considering whether they might be behind the same NAT). Still referring to FIG. 1 by way of example, if some presence updates can be handled in this manner, then this reduces processing burden on the router 111 and supernode 102(E) and reduces the probability of packet loss due to the reduced number of hops. As discussed, such problems can be particularly problematic in the case of presence updates, where numerous presence requests and responses are continuously being routed through the router 111 and supernode 102(E) due to periodic presence updates polled by the clients 222 on each node 102(A . . . E).

Before directly polling the presence however, the process moves to step S40 at which the client 222 probed whether such direct communication is in fact possible. It cannot be ruled out that direct communication is still not possible. For example, the local network 110 might be divided into separate subnets (e.g. corresponding to different departments in a large organisation) connected by a router which might block UDP traffic.

This probing could be achieved by first attempting to send a probing message to the node to be polled directly over the local network 110. If a response is not received or a negative response is returned from some other element of the local network such as a local router or server (not shown), then direct communication may still not be possible despite the two nodes being part of the same local network 110, e.g. due to network restrictions. In this case the process moves to step S50, substantially similar to Step S30, at which the presence is polled indirectly via an external route such as via a supernode, e.g. 102(E). Preferably however, there may be no need for any special probing message to achieve the probing. Instead an actual presence polling request is preferably sent to probe whether direct communication is possible. If it succeeds, the polling node (e.g. 102(A)) both: (i) knows that direct communication is indeed possible, and (ii) receives requested presence information. Thus the presence request and probing may preferably be achieved by means of the same message.

If the probing is successful, the process moves to step S60 at which the polling node, e.g. 102(A), sends a polling request to the polled node, e.g. 102(B), directly via the local network 110 without routing via the external Internet 108; and the polled node sends the presence response (if online) back to the 102(A) also directly over the second network without routing via the external Internet 108.

It will be appreciated that the above embodiments are described only by way of example.

For instance, presence not need not necessarily be polled periodically, or not necessarily polled at all. Instead for example, presence could be advertised to all users on contact list without waiting for a presence polling request from another client, and/or presence need not necessarily be handled autonomously by the client but could instead be explicitly requested by the user. Further, presence need not refer to any particular type of presence, but could generally be any availability status of the user node in question.

Although the above has been described mainly in terms of a peer-to-peer (P2P) system, the present invention is not specific to P2P and may be applied to any kind of packet-based communications system, such as more the centralised VoIP systems mentioned previously. E.g. the nodeinfo or external IP addresses need not necessarily be retrieved from a supernode, and when external routing of presence is required then the presence messages need not necessarily be routed through a supernode. In other types of system for example a central server could be used for one or both of these purposes.

The present invention is not limited in its application to any particular types of network. More generally the present invention can apply to any two networks whereby multiple nodes of a second network map to fewer addresses of the first network. For example, the present invention is not limited to use over the Internet, but more generally the first network could be type of network (preferably packet-based). Further, the "local" or second network is not necessarily behind any specific NAT scheme implying any particular standardized scheme. The local or second network may be private in the sense that some kind of authorization is required to be included or to access, or at least that access is restricted or controlled. A private network is typically a network that uses private IP address space. However, the local or second network need not be private.

Where it is said that the presence is communicated "directly" over the second or local network, note that most broadly this only means without routing externally via the first network. The relevant message(s) may still need to be routed via internal elements of the local or second network such as a local router or local server, but the route is still considered "direct" in the context used herein.

The address translator may usually be preferred to be implemented using a look-up table implemented on a memory of the router 111, but could alternatively be implemented by means of an analytical algorithm or in dedicated hardware.

Other configurations and applications of the present invention may be apparent to the person skilled in the art given the disclosure herein. The scope of the invention is not limited by the described embodiments, but only by the appended claims.

The invention claimed is:

1. A communication system comprising:
   at least one user node configured to:
   enable access to the at least one user node via a first network through a first-network address associated with the at least one user node, the first-network address configured to collectively identify the at least one user node to the first network;
   have a network address identifying the at least one user node internally within a second network;
   have an availability status relating to an availability of a respective user associated with the at least one user node; and
   enable an address translator to map said second-network address to the first-network address associated with the at least one user node;
   wherein the at least one user node is installed with a communication client configured to:
   enable communication with another user node internal to the second network, via the second network, using a second-network address associated with the another user node;
   enable communication with a user node external to the second network and associated with the first network using the first-network address;
   compare a network address of the at least one user node and a network address associated with a second user node effective to determine whether the at least one user node and the second user node are both of said second network;
   responsive to determining the at least one user node and the second user node are both nodes of said second network:
      probe whether direct communication between the at least one user node and the second user node over the second network is possible;
      responsive to determining direct communication between the at least one user node and the second user node is possible:
         poll an availability status of the second user node directly over the second network without routing via the first network; and
         communicate the availability status of the at least one user node to the second user node directly over the second network without routing via the first network;
   responsive to determining direct communication between the at least one user node and second user node over the second network is not possible, communicate the availability status by routing through at least one user node associated with the first network which stores part of a distributed database; and retrieve the network address associated with the second user node from the at least one user node associated with the first network which stores part of a distributed database, the distributed database configured to store first-network addresses.

2. The system of claim 1, wherein:
comparing the network address of the at least one user node and a network address associated with the second user node comprises comparing first-network addresses; and wherein
the communication client is further configured to:
determine, responsive to comparing the first-network address associated with the second user node with the first-network address associated with the at least one user node, that one of the second user node and the at least one user node is a node of the first network; and
responsive to determining that the second user node is a node of the first network, enable communication of an availability status of one of the second user node and the at least one user node between the second user node and the at least one user node via the first network.

3. The system of claim 1, wherein:
comparing the network address of the at least one user node and a network address associated with the another user node comprises comparing first-network addresses; and wherein
the communication client is further configured to:
determine, responsive to comparing the first-network address associated with the another node with the first-network address associated with the at least one user node, that the another user node and the at least one user node are both nodes of said second network;
probe, responsive to determining that both nodes are of said second network, whether direct communication between both nodes over the second network is possible; and
communicate, responsive to determining direct communication between both nodes over the second network is possible, the availability status directly over the second network without routing via the first network.

4. The system of claim 1, wherein the communication client is further configured such that said polling is periodic.

5. The system of claim 1, wherein the communication client is further configured to:
compare a first-network address associated with the at least one user node with those of a plurality of others of said user nodes; and
for each of the plurality of other user nodes:
if the compared first-network addresses match such that the other user node of the plurality of other user nodes is a node of said second network, poll the availability status of that other user node of the plurality of other user nodes directly over the second network without routing via the first network; and
if the compared first-network addresses do not match such that the other user node of the plurality of other user nodes is a node of the first network, communicate an availability status between the other user node and at least one user node via the first network.

6. The system of claim 1, wherein said first network is a public network and said second network is a private network requiring authorisation to access.

7. The system of claim 1, wherein said first network comprises the Internet and said first addresses are IP addresses.

8. A computer-implemented method comprising:
comparing a network address associated with a first user node and a network address associated with a second user node, the first user node and second user node being from a plurality of user nodes, the plurality of user nodes comprising at least some user nodes associated with a first network and at least some user nodes associated with a second network, each user node from the at least some user nodes associated with the first network having a respective first-network address identifying it within the first network, each user node from the at least some user nodes associated with the second network having a respective second-network address identifying it internally within the second network and an availability status relating to an availability of a respective user of a said user node associated with the second network;
enabling communication with a user node from the at least some user nodes associated with the first network via the respective first-network address of the user node from the at least some user nodes associated with the first network;
responsive to comparing the network address associated with the first user node and the network address associated with the second user node, determining whether the network addresses match such that both are nodes of said second network;
responsive to determining that the first user node and the second user node are both of said second network, communicating the availability status of one of said first and second user nodes between said first and second user nodes directly over the second network without routing via the first network;
enabling retrieval of a network address of another user node of the plurality of user nodes from a user node of the plurality of first user nodes associated with the first network, the user node from the plurality of first user nodes associated with the first network configured to store part of a distributed database of first-network addresses;
comparing the network address of the second user node with a network address of the another user node of the plurality of user nodes;
responsive to comparing the network addresses of the second user node and the another user node, determining whether the network address associated with the second user node and the network address of the another user node match such that both the second user node and the another user node are nodes of said second network;
responsive to determining that both said second user node and the another user node are of said second network:
probing whether direct communication between said both nodes over the second network is possible;
polling the availability status of the another user node directly over the second network without routing via the first network; and
communicating the availability status directly over the second network without routing via the first network; and
responsive to determining direct communication between said both second and the another nodes over the second network is not possible, communicating the availability status by routing through the user node from the plurality of first user nodes associated with the first network which stores said part of the distributed database.

9. The method of claim 8 further comprising:
responsive to comparing the network address associated with the first user node and the network address associated with the second user node, determining whether one of said first and second user nodes is a node of the first network; and responsive to determining one of said first and second user nodes is a node of the first network, communicating an availability status of one of said first and second user nodes between said first and second user nodes via the first network.

10. The method of claim 8, wherein communicating the availability status of one of said first and second nodes between said first and second user nodes directly over the second network further comprises:
   probing whether direct communication between said first and second user nodes over the second network is possible; and
   responsive to determining direct communication between said first and second user nodes is possible, communicating the availability status directly over the second network without routing via the first network.

11. The method of claim 8, wherein the polling is periodic.

12. The method claim 8 further comprising:
   comparing a first-network address associated with the second user node with those of a plurality of others of said user nodes, the first network address associated with the second user node configured to collectively identify the at least some user nodes associated with the second network to the first network;
   determining, for each of the plurality of other user nodes, if the compared first-network addresses match such that the other user node is a node of said second network;
   responsive to determining that the other user node is a node of said second network, polling the availability status of that other user node directly over the second network without routing via the first network; and
   responsive to determining that the other user node is a node of the first network, communicating an availability status of one of the second user node and the other user node of the plurality of other user nodes between said second user node and the other user node via the first network.

13. The method of claim 8, wherein said first network is a public network and said second network is a private network requiring authorisation to access.

14. The method of claim 8, wherein said first network comprises the Internet and said first addresses are IP addresses.

15. A communication client configured to enable communication using a first network comprising a plurality of first user nodes each having a respective first-network address identifying it within the first network, a second network comprising a plurality of second user nodes each having a respective second-network address identifying it internally within the second network, each of the second user nodes having an availability status relating to an availability of a respective user of that second user node, and a router mapping said second-network addresses to a lesser number of first-network addresses identifying the second user nodes collectively to the first network; wherein the communication client comprises code embodied on a computer-readable hardware storage medium and configured so as when executed on a respective one of the second user nodes to:
   communicate with another of said second user nodes via the second network using the second-network addresses;
   communicate with the first user nodes via the router and first network using the first-network addresses;
   enable retrieval of the first-network address from at least one user node of the plurality of first user nodes having a respective first-network address identifying it within the first network, the at least one user node of the plurality of first user nodes configured to store part of a distributed database of first-network addresses;
   compare the first-network address of the respective second user node with that of another of said user nodes;
   responsive to comparing the first-network addresses, determine whether the first-network addresses match such that both are nodes of said second network;
   responsive to determining said both nodes are of said second network, probe whether direct communication between said both nodes over the second network is possible;
   responsive to determining direct communication between both said nodes over the second network is possible, enable the availability status to be communicated directly over the second network without routing via the first network;
   responsive to determining direct communication between both said nodes over the second network is not possible, enable the availability status to be communicated by routing through the at least one user node of the plurality of first user nodes configured to store part of the distributed database of first-network addresses; and
   responsive to determining said both nodes are of said second network, enable polling the availability status of the other user node directly over the second network without routing via the first network.

16. The communication client of claim 15, wherein the code is configured such that said polling is periodic.

\* \* \* \* \*